United States Patent [19]
Harikrishnan et al.

[11] Patent Number: 6,049,663
[45] Date of Patent: Apr. 11, 2000

[54] METHOD AND FACILITY FOR UNINSTALLING A COMPUTER PROGRAM PACKAGE

[75] Inventors: Seetharaman Harikrishnan; Jeffrey T. Parsons, both of Redmond; Felix Andrew, Seattle; Christopher J. Guzak, Kirkland, all of Wash.

[73] Assignee: Microsoft Corporation, Redmond, Wash.

[21] Appl. No.: 09/097,723

[22] Filed: Jun. 16, 1998

Related U.S. Application Data

[63] Continuation of application No. 08/609,283, Mar. 1, 1996, Pat. No. 5,768,566.

[51] Int. Cl.[7] .................................................. G06F 9/455
[52] U.S. Cl. ................................. 395/500.43; 395/712
[58] Field of Search .......................... 395/712, 500.43; 707/1, 10, 204

[56] References Cited

U.S. PATENT DOCUMENTS

| | | |
|---|---|---|
| 5,075,845 | 12/1991 | Lai et al. . |
| 5,163,148 | 11/1992 | Walls ........................................ 707/204 |
| 5,193,184 | 3/1993 | Belsan et al. . |
| 5,403,639 | 4/1995 | Belsan et al. . |
| 5,469,573 | 11/1995 | McGill, III et al. ..................... 395/712 |
| 5,485,606 | 1/1996 | Midgdey et al. .......................... 707/10 |
| 5,602,993 | 2/1997 | Strömberg . |
| 5,768,566 | 6/1998 | Harikrishnan et al. .................. 395/712 |
| 5,813,017 | 9/1998 | Morris ...................................... 707/204 |

OTHER PUBLICATIONS

J. Rapoza, "No Standout In Uninstall Field; Uninstaller Is Still Reliable, But Upstarts Offer Added Features," *PC Week*, v12 n9, p71 (1995).

N. Anis, "Vertisoft Intros Remove–It! Windows Uninstaller," *Newsbytes*, Oct. 31, 1994.

*Primary Examiner*—Kevin J. Teska
*Assistant Examiner*—Dan Fiul
*Attorney, Agent, or Firm*—Christensen O'Connor Johnson & Kindness PLLC

[57] ABSTRACT

A computer program product has a facility for uninstalling itself. The facility is both efficient and dynamic. The facility only backs up a minimal set of files that may be affected by an installation of the computer program product. The facility dynamically adapts to different possible installations so as to only store backup copies for the particular installation that is to be used. The facility leverages a number of installation files to determine what files to back up.

15 Claims, 6 Drawing Sheets

METHOD AND FACILITY FOR UNINSTALLING A COMPUTER PROGRAM PACKAGE

CROSS REFERENCE TO RELATED APPLICATIONS

This is a continuation of U.S. application Ser. No. 08/609,283, filed on Mar. 1, 1996 now U.S. Pat. No. 5,768,566.

TECHNICAL FIELD

The present invention relates generally to data processing systems, and more particularly, to uninstalling a computer program package in computer systems.

BACKGROUND OF THE INVENTION

When a computer program package is uninstalled, the computer system on which the computer program has been installed is modified to attempt to return the computer system to a state where the files that were present on the system before the computer program package was installed are again present on the system in their original form. Many conventional computer program packages include a limited ability to uninstall themselves. A first approach to uninstalling computer program packages that has been adopted by conventional systems has been to maintain a hard-coded list of directories that are manipulated by the installation program of the computer program package. All of the directories on the list are backed up (i.e., stored on secondary storage) so that if the user wishes to later uninstall the computer program package, the directories that have been backed up may be rewritten on the computer system. A substantial drawback of this approach is that the backed up directories occupy a substantial amount of secondary storage space.

Another alternative approach to uninstalling a computer program package that has been adopted by conventional systems has been to delete all files associated with the computer program package. Unfortunately, this can have deleterious effects because certain unintended files may be deleted. For example, if the computer system on which the computer program package is installed has a first version of a computer program package stored on secondary storage and the computer system is installing a second version of the same computer program package, this uninstalling approach may result in the deletion of both versions of the computer program package. Moreover, this approach may delete files that are shared and used by other computer programs.

SUMMARY OF THE INVENTION

The limitations of the conventional systems are overcome by the present invention. A first aspect of the present invention is directed to a method that is practiced on a computer system that has a storage area in which a set of files is stored. Per this method, a computer program package is provided that has multiple files for installation on the computer system. The computer program package has a number of different possible installations wherein which of the multiple files of the computer program package are installed depends on which installation is performed. It is determined that a selected one of the installations is to be performed and a subset of the set of files that may be affected by the selected installation is identified. Backup copies of the subset of files are stored in the storage area so that these files may later be used to uninstall the computer program package. This method may rely upon a comprehensive list of files that list all the files that may be manipulated by each of the possible installations.

In accordance with another aspect of the present invention, a computer program package that has different possible installations is provided. Where it is determined that a first of the possible installations is to be performed, a first subset of the set of files that are stored in a storage area of the computer system are identified and backup copies of this first subset of files are stored in the storage area. On the other hand, where it is determined that a second of the possible installations is to be performed, a second subset of the set of files that may be affected when the second of the possible installations is performed is identified and backup copies of the second subset of files are stored in the storage area.

In accordance with an additional aspect of the present invention, a function is used to generate a list of each file that may be affected for each possible installation of a computer program package that has multiple files that may be installed. Backup copies of files are stored based on the generated list and the same function is used to perform a selected one of the possible installations.

In accordance with a further aspect of the present invention, a computer-readable storage media holds a first file that is logically divided into sections. These sections include a section that lists files that have been added to a computer system as a result of installation of a computer program package. These files are for use when uninstalling the computer program package. The first file also includes a section listing files that have been deleted from the computer system as a result of installation of the computer program package and a section listing files that have been renamed as a result of installation of the computer program package. These lists of files are used when uninstalling the computer program package. The storage media may also hold compressed versions of the files that are listed as having been deleted or having been replaced during installation of the computer program package.

BRIEF DESCRIPTION OF THE DRAWINGS

The present invention will be described in more detail below with reference to a preferred embodiment which is depicted in the following figures.

DETAILED DESCRIPTION OF THE INVENTION

The preferred embodiment of the present invention provides a facility and approach for uninstalling a computer program package that is both efficient and dynamic. The preferred embodiment of the present invention is efficient in that it only backs up a minimal set of files that may have been affected by installation of the computer program package. The preferred embodiment is dynamic in that it does not automatically back up a fixed set of files; rather it dynamically identifies the files that need to be backed up based upon the installation options chosen by the user and the current computer configuration. In addition, the preferred embodiment provides an uninstalling approach that accounts for additional optional components and hardware that have been added to the computer system after the initial installation.

The preferred embodiment of the present invention provides a comprehensive list of files that may be affected by installation of the computer program package. For purposes of the discussion below, it is assumed that the computer program package being installed is an operating system. The comprehensive list may be provided on the storage medium in which the computer program package is sold or may be dynamically determined at the time of installation of the computer program package. This list of files that may be potentially affected is examined at the time of installation of the computer program package and compared with the list of files stored on a target computer system at which the computer program package is to be installed. The files that are on the list and resident at the target computer system are backed up in a compressed data format that minimizes the amount of storage space the files occupy. A list of the files that have been added, renamed, replaced and deleted during installation is also stored in conjunction with the backed up files. When a user or other entity requests that the computer program package be wholly uninstalled, the preferred embodiment uses the record of what files have been affected by the installation and the backup files to uninstall the computer program package.

Figure 1:
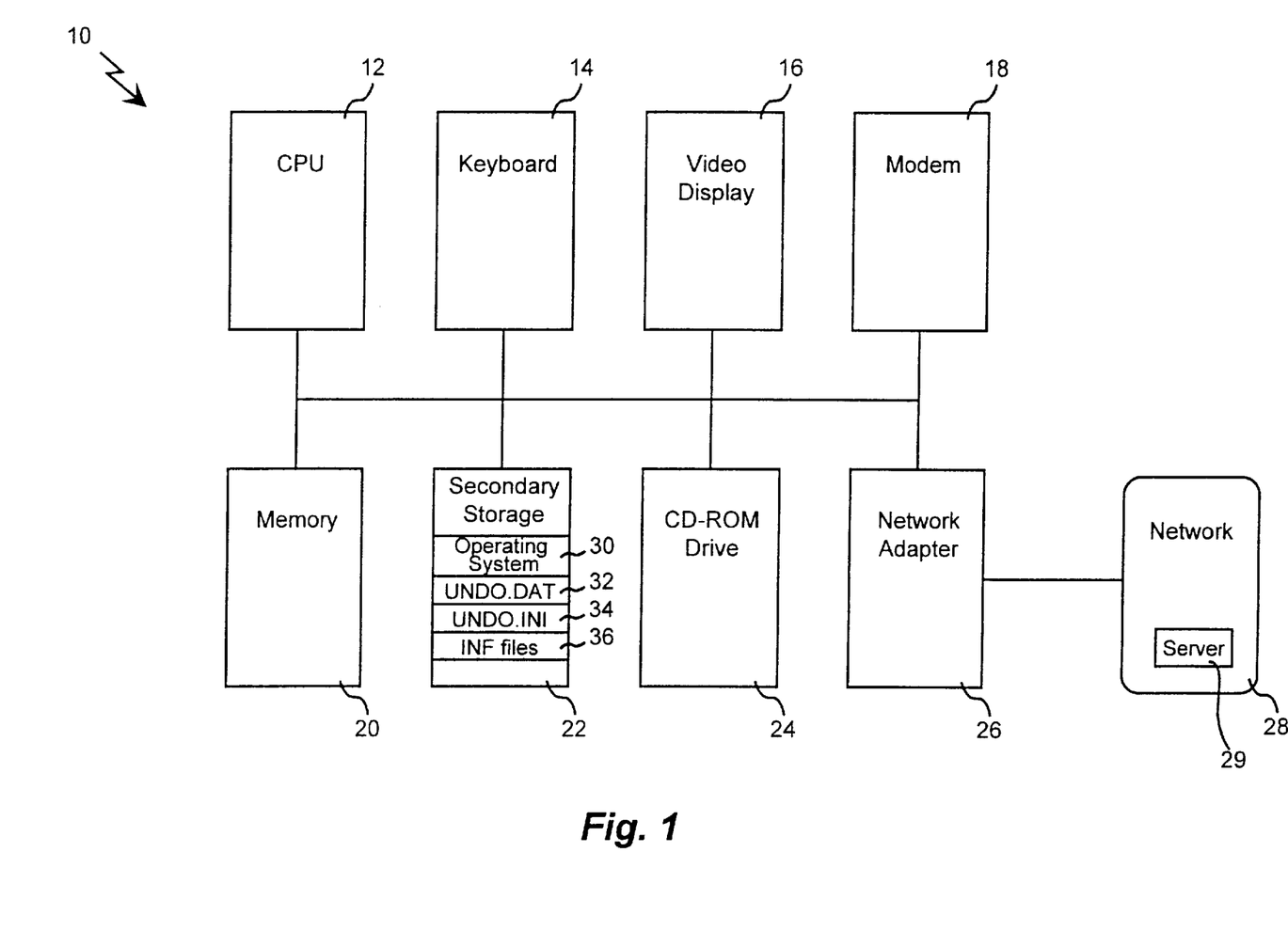
FIG. 1 is a block diagram that illustrates a computer system that is suitable for practicing the preferred embodiment of the present invention.

FIG. 1 is a block diagram of computer system 10 that is suitable for practicing the preferred embodiment of the present invention. The computer system 10 includes a central processing unit (CPU) 12 and a number of peripheral devices, including a keyboard 14 and a video display 16. The computer system 10 may also include a modem 18 for enabling the computer system to communicate with other remote computer systems. The computer system 10 also contains a memory 20 and a secondary storage 22, as well as additional secondary storage devices, such as CD-ROM drive 24. The computer system 10 includes a network adapter 26 for connecting the computer system with a network 28 that includes a server 29.

Although the preferred embodiment of the present invention will be described below relative to a single computer system, those skilled in the art will appreciate that the present invention may also be practiced in distributed environments wherein a computer program package is being installed at a client computer system 10 and the computer program package and setup program are resident at the server 29 in a remote network 28.

The secondary storage 22 holds a copy of an operating system 30. For purposes of illustration, it is assumed that the operating system 30 in the discussion below is the Microsoft® Windows® 95 operating system, sold by Microsoft Corporation of Redmond, Wash. The operating system 30 includes code for installing itself as well as a number of initialization and other files. These files include the UNDO.DAT file 32, the UNDO.INI file 34, and the INF files 36.

In order to understand how the preferred embodiment of the present invention operates, it is helpful to review the format of the INF files 36. An INF file is an installation text file that is logically divided into sections. Each of the sections of an INF file includes a generic means to specify copy, delete or rename operations (i.e. keys that specify whether files are to be copied, renamed or deleted). Set forth below is an example of an INF file.

---

[version]
LayoutFile=layout.inf
signature="$CHICAGO$"
[GenInst]
CopyFiles = boot.files, sys.files
RenFiles = ren.old.files
DelFiles = del.old.root
[GenInst2]
CopyFiles = ios.files, VxD.Files
[boot.files]
command.new, command.com,,1
sulogo.sys,,,1
winboot.new, winboot.sys,,1
[ren.old.files]
mode_dos.com, mode.com
[sys.files]
advapi32.dll,,,8
cmdlg32.dll,,,8
comm.drv
commctrl.dll, kommctrl.dll, kommctrl.dll
ctrdll.dll,,,8
[del.old.root]
WINA20.386
[ios.files]
apix.vxd
cdfs.vxd
cdstd.vxd
hsflop.pdr
[VxD.Files]
biosxlat.vxd,,,1
configmg.vxd,,,1
vpicd.vxd,,,1
v86mmgr.vxd,,,1
[DestinationDirs]
;Destination directories for sections listed in the CopyFiles=, Delfiles= and
;RenFiles= directives.
;and associated pre-defined Logical Disk Identifiers (LDID).
;
;<file-list section> = <pre-defined LDID>[,<subdir>]
;
ren.old.files = 34    ;LDID_OLD_DOS(user's old DOS dir.)
boot.files = 30       ;LDID_BOOT(root of boot drive)
sys.files = 11        ;LDID_SYS(WINDOWS\SYSTEM dir.)
del.old.root = 30     ;LDID_BOOT(root of boot drive)
VxD.Files = 22        ;LDID_VMM32
                      (VMM32 directory off of WINDOWS\SYSTEM)
ios.files = 12        ;LDID_IOS
                      (IOSUBSYS directory off of WINDOWS\SYSTEM)

---

In the above example, the sections are delineated by bracketed headers. For instance, the first section of the above INF file is the "[version]" section. Sections may be unconditional generic installation sections that are always utilized during installation and conditional sections that are only utilized if certain conditions are detected. The "[GenInst]" and "[GenInst2]" sections are examples of unconditional generic installation sections. Underneath the headings for the sections are a list of files to be copied, renamed or deleted. The "CopyFiles" directive specifies the files that are to be copied. These copies are itemized after the equals sign. Similarly, the "RenFiles" directive specifies the files that are to be renamed follow and the "DelFiles" directive specifies the files to be deleted. In the above example, "CopyFiles= boot.files, sys.files" at the first line of the "[GenInst]" section specifies that the files itemized in the "[boot.files]" section and "[sys.files]" section are to be copied. The "[boot.files]" section contains a list of boot files that are to be copied on installation and the "[sys.file]" section contains a list of system files that are to be copied on installation.

The next line of the "[GenInst]" section contains the statement "RenFiles =ren.old.files," which specifies that the files to be renamed are found in the "[ren.old.files]" section. The "[ren.old.files]" section contains both the old filename and the renamed filename. Lastly, the statement "DelFiles= del.old.root," at the third line of this section, specifies that files to be deleted upon installation are listed in the "[del.old.root]" section.

The "[DestinationDirs]" section of the INF file holds destination directories for sections that are listed after the CopyFiles, DelFiles and RenFiles directives. These directories are identified by logical disk identifiers (LDID). For example, the statement "ren.old.files=34" in this section indicates that the directory for the old file is at LDID 34.

The installation of the operating system 30 is, in large part, a matter of processing each of the INF files that are provided. A setup engine is provided in the operating system to look at these INF files and determines which files to copy, which files to delete, which files to rename and which files to replace. The use of the INF files in the installation of the operating system 30 is leveraged in the preferred embodiment of the present invention to assist uninstalling of the operating system, as will be described in more detail below.

Figure 2:
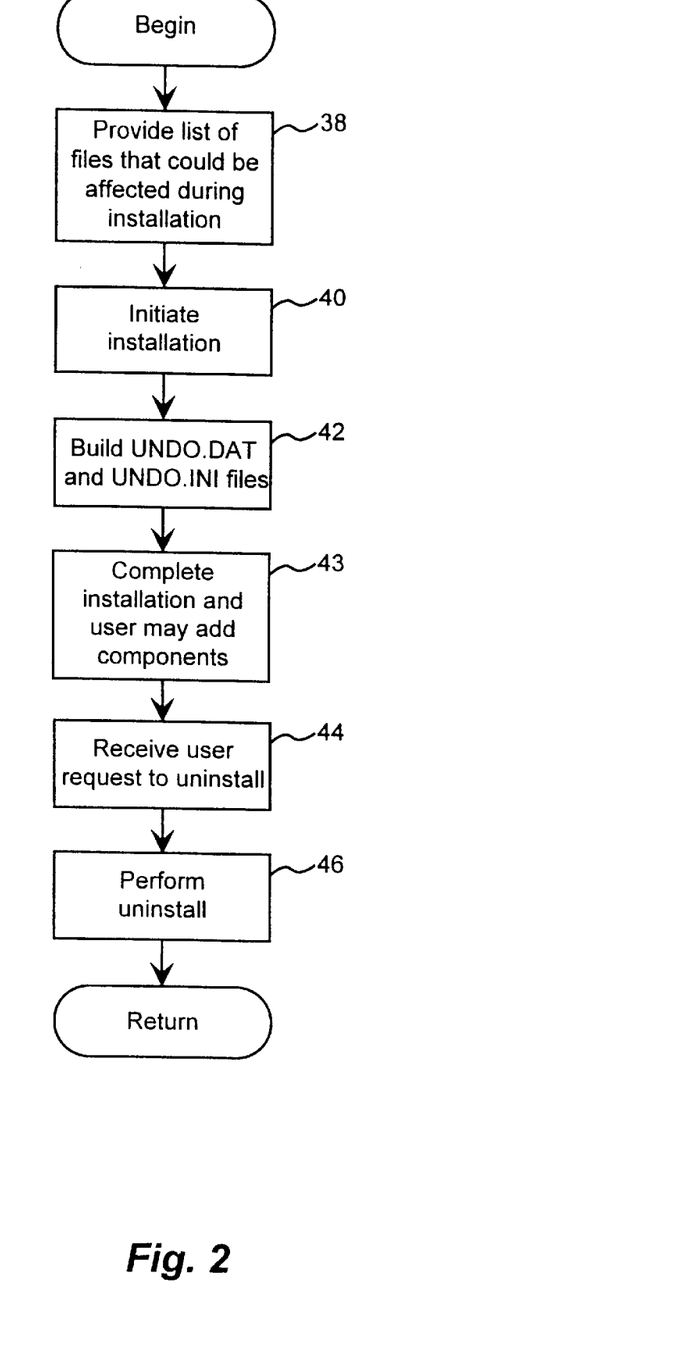
FIG. 2 is a flowchart illustrating the steps that are performed to uninstall a computer program in accordance with the preferred embodiment of the present invention.
Figure 3:
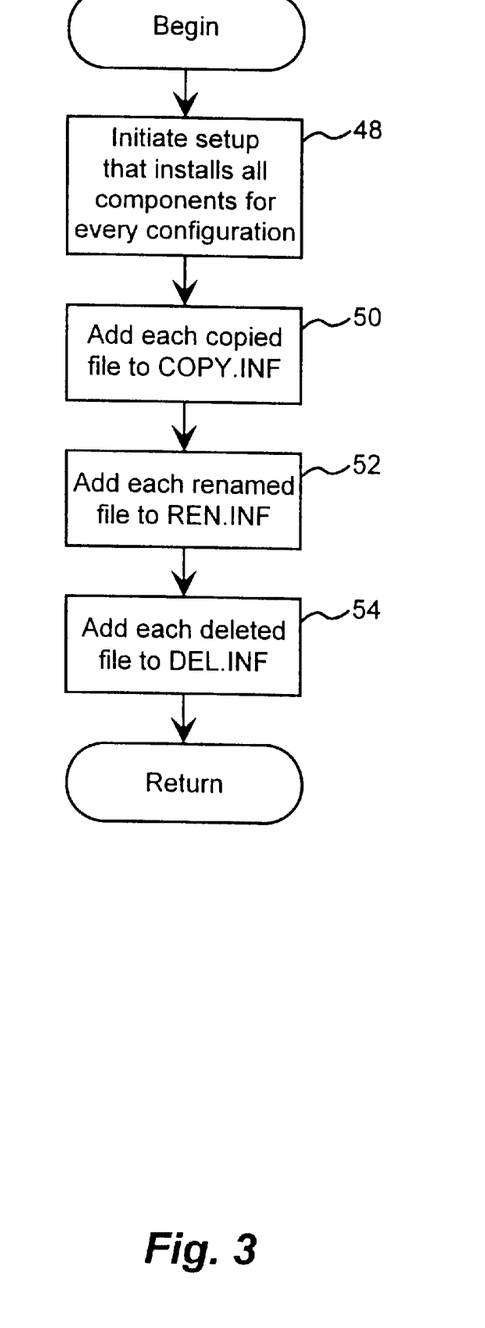
FIG. 3 is a flowchart illustrating the steps that are performed to generate a list of files that may be potentially affected by installation in the preferred embodiment of the present invention.

FIG. 2 is a flowchart that provides an overview of how the operating system 30 is uninstalled in the preferred embodiment of the present invention. Initially, a list of all files that could be affected during installation is provided (step 38 in FIG. 2). This list may be shipped with the computer program package or may be generated during the installation of the computer program package. FIG. 3 is a flowchart illustrating the steps that are performed to generate such a list of files. A setup program is initiated that acts as if it seeks to install all possible installations to generate the list of files. In other words, a universal setup program is run to generate the list of files (step 48 in FIG. 3). The installation, however, does not actually take place, as will be described in more detail below. The computer system 10 then generates three INF files. The first such file is the COPY.INF file which holds information regarding each file that is copied during installation with the universal setup program running. The second such INF file, REN.INF, holds information for each file that is renamed during the execution of the universal setup program, and the third such INF file, DEL.INF file, holds information for each of the files that is deleted during execution of the universal setup program. While the universal setup program is executing, information is added to these three INF files. Specifically, each copied file is added to COPY.INF (step 50 in FIG. 3). Similarly, each file that is renamed is added to REN.INF (step 52 in FIG. 3), and each file that is deleted is added to DEL.INF (step 54 in FIG. 3). The net result is that universal lists of all files that may be copied, renamed or deleted during any possible installation are generated. The INF files specify the filename and destination LDID for the associated copied, renamed or deleted files. Although the preferred embodiment of the present invention implements three INF files, those skilled in the art will appreciate that the present invention may also be practiced with a system that generates a single INF file that is divided into three sections: one for copied files, one for renamed files and one for deleted files.

In performing the above-described mock setup for generating the three INF files, the computer system 10 uses the GenInstallEx( ) application program interface (API) that is provided as part of the setup engine for the operating system 30. The GenInstallEx( ) API is passed a handle to the INF file which it is to process to realize installation. The API is also passed the name of the section that has appropriate directives for performing the installation is also passed to this API. The identity of a call-back procedure is also passed to the GenInstallEx( ) API. The call-back procedure is called by the GenInstallEx( ) API before any copy, delete, or rename operation is performed. The call-back procedure is used to create the three INF files by logging information with which it is called into the INF files. The call-back procedure tells the GenInstallEx( ) API to skip the operation and proceed to the next operation. As a result, the copy, delete, and rename operations are not performed, but a dry run of a full setup installation is performed so that the list of all files that can potentially be affected by installation is generated. Subsequently, the GenInstallEx( ) API is utilized during the actual installation. When the GenInstallEx( ) API is used during installation, the call-back procedure does not log information and does not tell the API to skip operations.

After the list of files that could be affected during initialization is provided (see step 38 in FIG. 2), installation of the operating system 30 is initiated (step 40 in FIG. 2). The user may be presented with user interface or other mechanism for specifying options regarding the installation. Once all these options are specified, the appropriate information must be backed up. Alternatively, the system may assume that the user seeks to install all possible installations without waiting for the options to be selected. The files are backed up assuming any files on the system that are on the list of files that may be affected will be affected by the installation. In the preferred embodiment of the present invention, this backed up information takes the form of two files: UNDO.DAT and UNDO.INI. The UNDO.DAT file holds each of the files that is to be backed up in compressed file format, whereas the UNDO.INI file holds information regarding the files that are backed up. Thus, the process of backing up the appropriate information involves building the UNDO.DAT and UNDO.INI files (step 42 in FIG. 2).

Before describing how the UNDO.DAT and UNDO.INI files are built, it is helpful first to review the file format of the UNDO.INI file. The UNDO.INI file is logically partitioned into sections and includes an "[Added]" section that contains information for files that were added by the operating system. The UNDO.INI file also includes a "[Deleted]" section that contains information for files that were deleted and a "[Replaced]" section that contains information for files that were replaced (i.e., one version of the file was replaced with another version of the file) during installation. The UNDO.INI file also contains a "[Renamed]" section that contains information for renamed files. In addition, the UNDO.INI file contains a "[Paths]" section that contains the actual pathnames for various destination LDIDs where files are modified.

The lines of text contained under the "[Added]" section identify a file specification that is a combination of a directory ID with a filename/path for the added file. For example, "11, rundll32.exe" is an example of a file specification that provides a directory ID of 11 and a filename of "rundll32.exe."

The lines of text that appear in the "[Deleted]" section and the "[Replaced]" section specify a file specification, an original size of the file, the date on which the file was last modified, the time at which the file was last modified, the original attributes of the file, and the offset of original file contents in a DAT file.

The lines of text in the "[Renamed]" section specify a file specification for the new filename and a file specification for the old filename. Lastly, the lines of text in the "[Paths]" section specify a mapping of a directory ID to a fully qualified pathname for a destination directory.

Figure 4:
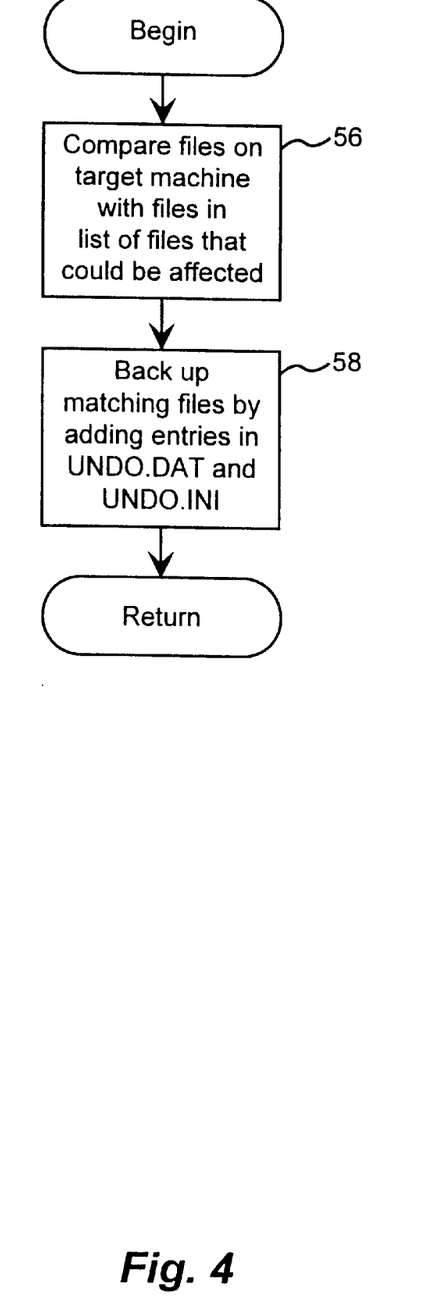
FIG. 4 is a flowchart illustrating the steps that are performed to determine what files should be backed tip in the preferred embodiment of the present invention.

FIG. 4 is a flowchart illustrating the steps that are performed to build the UNDO.DAT and UNDO.INI files (see step 42 of FIG. 2). Initially, each of the files stored on the computer system are compared to the files in the list of files that could be affected during installation, which was provided in step 38 of FIG. 2 (step 56 in FIG. 4). The files that match those in the list are backed up by adding entries in the UNDO.DAT and UNDO.INI files (step 58 in FIG. 4). The computer system 10 is aware of the mapping of the LDIDs to actual paths and can provide this information for the generation of the UNDO.INI file. The backup files are stored in a compressed file format. After the UNDO.DAT and UNDO.INI files have been created, the installation may go forward until completed (see step 43 in FIG. 2).

Figure 5:
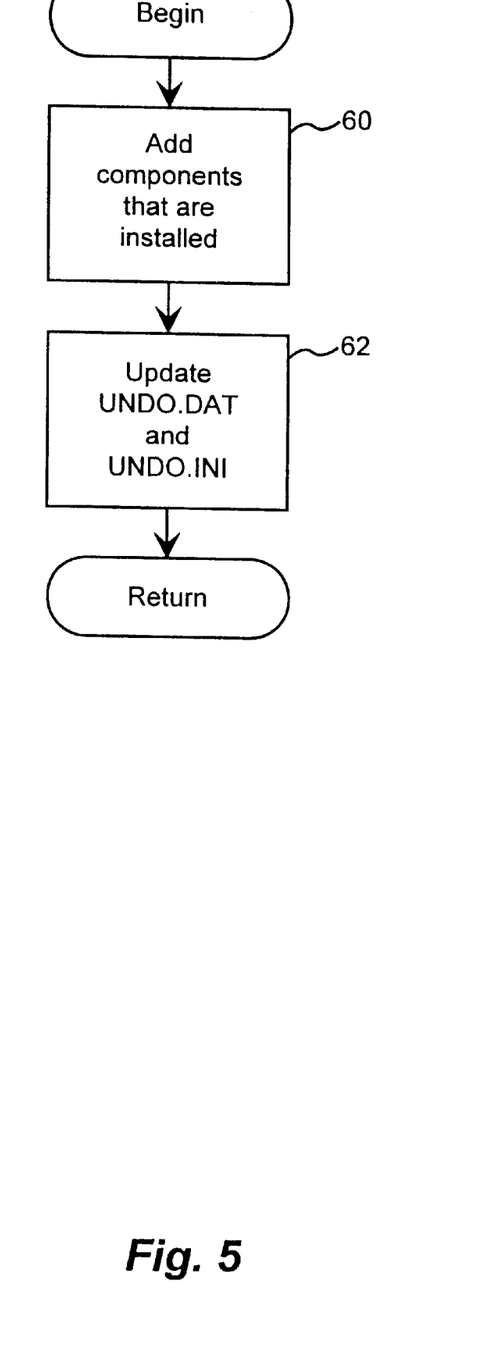
FIG. 5 is a flowchart illustrating the steps that are performed to account for changes in components that are installed after initial installation in accordance with the preferred embodiment of the present invention.

In many instances, however, the configuration of the operating system may change by a user adding hardware or adding components (see step 43 in FIG. 2). FIG. 5 is a flowchart illustrating the steps that are performed in such instances. Initially, components are added for the computer program package (step 60 in FIG. 5). For example, new drivers may be added when a new hardware component is added to the computer system 10. The UNDO.INI and UNDO.DAT files must be updated to reflect the files that have been added, deleted, replaced or renamed by the addition of the component (step 62 in FIG. 5). The operating system provides a facility for updating these files properly.

Figure 6:
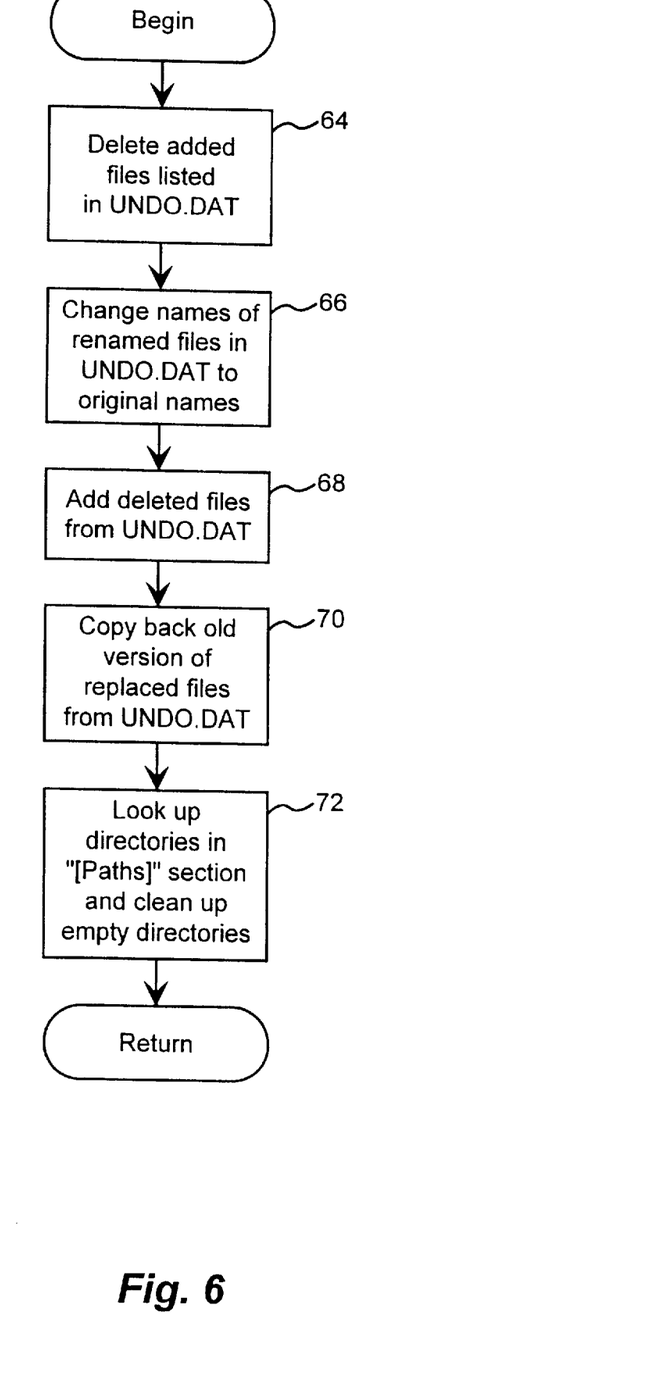
FIG. 6 is a flowchart illustrating the steps that are performed to uninstall a computer program in accordance with the preferred embodiment of the present invention.

The uninstall facility is invoked when a user or other program request is received to wholly uninstall the operating system (step 44 in FIG. 2). The uninstall facility then proceeds to uninstall all of the components of the operating system 30 so as to return the files in the computer system 10 to as they were before installation of the operating system. The uninstall facility goes through the UNDO.INI file 34 on a section-by-section basis to determine how to undo the installation of the operating system. FIG. 6 is a flowchart of the steps that are performed by the uninstall facility. First, files listed under the "[Added]" section are deleted (step 64 in FIG. 6). Then, the names of files listed under the "[Renamed]" section are changed back to their original names (step 66 in FIG. 6). Deleted files listed under the "[Deleted]" section of UNDO.DAT are added back to their appropriate destination directories unless a copy of the deleted file is already found in storage (step 68 in FIG. 6). Replaced files listed under the "[Replaced]" section are then copied back into the directories (step 70 in FIG. 6). Lastly, the "[Paths]" section is walked and the directories listed therein are examined. If the directories are empty, the directories are cleaned up and removed (step 72 in FIG. 6). As a result, the uninstallation is completed.

One of the strengths of the preferred embodiment of the present invention is that it only backs up a minimal set of files that could be affected by installation. As a result, it occupies substantially less storage space than conventional brute force approaches. Moreover, the backing up of files is dynamic such that it varies depending upon the installation options chosen by a user. This also can result in fewer files being backed up.

While the present invention has been described with reference to a preferred embodiment thereof, those skilled in the art will appreciate that various changes in form and detail may be made without departing from the intended scope of the present invention as defined in the appended claims.

We claim:

1. In a computer system having a storage area in which a set of existing files is stored, a method comprising the computer-implemented steps of:

a) providing a computer program package having multiple files for installation on the computer system, said computer program package having a number of different possible installation configurations wherein which of the multiple files of the computer program package are installed depends on which installation configuration is performed;

b) determining that a selected one of the installation configurations is to be performed;

c) identifying a list of files that may be affected by performing the selected installation configuration, the identification comprising:

i. performing a mock installation that processes the selected installation configuration but that does not actually install any files;

ii. generating the list of files during the mock installation, the list of files including a file reference to each file processed in the mock installation, the file reference being associated with an action that would have been performed on the file if the mock installation had been an actual installation;

d) finding each corresponding file on the computer system that matches a file reference listed in the list of files;

e) storing a backup copy of each corresponding file in the storage area;

f) storing the file reference of each stored backup copy in an information file; and g) performing the actual installation of the selected installation configuration.

2. The method of claim 1, wherein the list of files is provided with the computer program package.

3. The method of claim 1, wherein the list of files includes every file that may be affected by performing every possible installation configuration.

4. The method of claim 3, wherein the storing of each backup copy is done automatically by an operating system as part of a universal setup program.

5. The method of claim 4, wherein the identifying the list of files is done automatically by the operating system as part of the universal setup program.

6. The method of claim 5, further comprising uninstalling the computer program package by:

a) reading the stored information file to determine a list of installed files and the action taken on each file in the list of installed files;

b) reversing the action on each installed file in the list of files, the reversing of the action comprising;

i) if the installed file was added to the storage area during the actual installation, reversing the action by deleting the installed file;

ii) if the installed file was renamed in the storage area during the actual installation, reversing the action by restoring an original name of the installed file;

iii) if the installed file was replaced in to the storage area during the actual installation, reversing the action by copying a stored backup copy of the installed file to the storage area; and iv) if a directory was inserted into the storage area, reversing the action by deleting the directory.

7. The method of claim 1, further comprising uninstalling the program by:

reading the stored information file to determine a list of installed files and the action taken on each file in the list of installed files;

a) reversing the action on each installed file in the list of files, the reversing of the action comprising;

i.) if the installed file was added to the storage area during the actual installation, reversing the action by deleting the installed file;

ii) if the installed file was renamed in the storage area during the actual installation, reversing the action by restoring an original name of the installed file;

iii) if the installed file was replaced in to the storage area during the actual installation, reversing the action by copying a stored backup copy of the installed file to the storage area; and iv) if a directory was inserted into the storage area, reversing the action by deleting the directory.

8. A computer-readable medium having computer-executable instructions for installing a computer program package having a plurality of files on a target computer, the computer-readable medium comprising:

computer-executable instructions for automatically creating a list of files by performing a mock install of the computer program package without actually installing the plurality of files, the list of files created during the mock install including a reference to each file that an action would be taken on during the installation of the computer program package, the reference being associated with the action to be taken on the file;

computer-executable instructions for storing the list of files;

computer-executable instructions for storing in a backup file a backup copy of each file that corresponds to a references in the list of files, the backup copy being a copy of the file as it existed on the target computer before the installation;

computer-executable instructions for installing the files associated with the references in the list of files on the target computer; and computer-executable instructions for uninstalling the files on the target computer by reading the stored list of files and reversing the action associated with each reference in the list.

9. The computer-readable medium of claim 8, wherein the list of files is created from a subset of the plurality of files, the subset of the plurality of files being defined by a selected installation configuration that is one of a number of installation configurations predefined for the computer program package.

10. The computer-readable medium of claim 9, wherein a backup copy is only stored for each file in the subset of files.

11. The computer-readable medium of claim 10, wherein the selected installation configuration is chosen by a user before the installation of the computer program package on the target computer.

12. The computer-readable medium of claim 8, wherein a subsequent installation is performed that add a supplemental reference to the stored list of files.

13. The computer-readable medium of claim 12, wherein a subsequent installation is performed that stores an additional backup copy of a file associated with the supplemental reference.

14. The computer-readable medium of claim 8, wherein a subsequent installation is performed that deletes a reference to an uninstalled file from the stored list of files.

15. The computer-readable medium of claim 14, wherein a subsequent installation is performed that deletes a backup copy of the uninstalled file from the backup file.

* * * * *

UNITED STATES PATENT AND TRADEMARK OFFICE
CERTIFICATE OF CORRECTION

PATENT NO. : 6,049,663
DATED : April 11, 2000
INVENTOR(S) : Harikrishnan et al.

It is certified that error appears in the above-identified patent and that said Letters Patent is hereby corrected as shown below:

On the title page, item [75] " JEFFREY T. PARSONS, REDMOND WASHINGTON "

should read -- JEFFREY T. PARSONS, ISSAQUAH WASHINGTON --.

Signed and Sealed this

Thirtieth Day of January, 2001

Attest:

Q. TODD DICKINSON

Attesting Officer

Director of Patents and Trademarks

UNITED STATES PATENT AND TRADEMARK OFFICE
CERTIFICATE OF CORRECTION

PATENT NO. : 6,049,663
DATED : April 11, 2000
INVENTOR(S) : S. Harikrishnan et al.

It is certified that error appears in the above-identified patent and that said Letters Patent is hereby corrected as shown below:

Item [75]
Page 1, column 1,
Line Inventors: "Seetharaman Harikrishnan; Jeffrey T. Parsons, both of Redmond;" should read --Seetharaman Harikrishnan, Redmond; Jeffrey T. Parsons, Issaquah;--

Column 2,
Line 1, "list" should read --lists--
Line 8, "are" should read --is--
Line 54, "tip" should read --up--

Column 4,
(Table, line 27) "cstd.vxd" should read --cdstd.vxd--
Line 61 "are" should read --is--

Column 6,
Line 1-2 "installation is also passed to this API" should read --installation.--
Line 20 "mechanism" should read --mechanisms--

UNITED STATES PATENT AND TRADEMARK OFFICE
CERTIFICATE OF CORRECTION

PATENT NO.   : 6,049,663
DATED        : April 11, 2000
INVENTOR(S)  : S. Harikrishnan et al.

It is certified that error appears in the above-identified patent and that said Letters Patent is hereby corrected as shown below:

Column 9, Claim 8,
Line 17, 26 "references" should read --reference--

Column 10,, Claim 12,
Line 2 and 18 "add" should read --adds--

Signed and Sealed this

Nineteenth Day of June, 2001

*Attest:*

NICHOLAS P. GODICI
*Attesting Officer*   *Acting Director of the United States Patent and Trademark Office*